United States Patent [19]

Carter, Jr. et al.

[11] 4,309,618
[45] Jan. 5, 1982

[54] PRECISION OPTICAL DISTANCE MEASUREMENT

[75] Inventors: Herman L. Carter, Jr., Gillette; Robert R. Hart, Westfield; Gerd F. H. Weissmann, Florham Park, all of N.J.

[73] Assignee: Bell Telephone Laboratories, Incorporated, Murray Hill, N.J.

[21] Appl. No.: 146,314

[22] Filed: May 5, 1980

[51] Int. Cl.$^3$ ............................................. G01C 3/08
[52] U.S. Cl. ...................................... 250/561; 356/4
[58] Field of Search ............... 250/231 R, 561; 356/4, 356/356, 358

[56] References Cited

U.S. PATENT DOCUMENTS

| | | |
|---|---|---|
| 2,740,901 | 4/1956 | Graham . |
| 3,016,464 | 1/1962 | Bailey . |
| 3,215,135 | 11/1965 | Franke . |
| 3,278,754 | 10/1966 | Wallace . |
| 3,327,584 | 6/1967 | Kissinger . |
| 3,580,082 | 5/1971 | Strack . |
| 3,744,906 | 7/1973 | Sato et al. . |
| 3,831,133 | 8/1974 | Coomo . |
| 3,885,872 | 5/1975 | Howe et al. . |

OTHER PUBLICATIONS

"Mechanical Measurements," by Beckwith et al., pp. 243-246, Addison-Wesley Publishing Co. (1961).
"Optocator" Advertising Brochure; Seleom Selective Electronic, Inc.
"Photoswitch" Type 22/23 Series 4000, Electronics Corp. of America, Oct. 1977.
"Optron," Types OPB706 & OPB707, Bulletin No. 668, Oct. 1977.

Primary Examiner—David C. Nelms
Assistant Examiner—Darwin R. Hostetter
Attorney, Agent, or Firm—Peter V. D. Wilde

[57] ABSTRACT

A method and apparatus are shown for precision distance or displacement measurement using a light source and a detector. A light emitting diode or laser are typical sources, and a photodiode or phototransistor are typical detectors. Light from the source is directed towards the detector directly, or reflected onto the detector by a reflective surface. By tilting the axis of the light source and detector, high sensitivity is possible. The effect of the tilted axes may be obtained by the use of two reflective surfaces. Typical resolution is on the order of 5 microinches over a range of 50,000 microinches (i.e., one part in $10^4$) using simple associated electronics, with higher resolution possible.

19 Claims, 6 Drawing Figures

PRECISION OPTICAL DISTANCE MEASUREMENT

BACKGROUND OF THE INVENTION

1. Field of the Invention

This invention relates to the precise measurement of small distances or displacements by means of an optical source and an optical detector.

2. Description of the Prior Art

The precision measurement of small distances of displacements is typically accomplished by resistance-type strain gauges, wherein a resistive element is attached to the structure being measured, and the change in resistance correlates to a change in displacement per unit length. While this is suitable for structures that are relatively unaffected by the force required in the operation of the strain gauge, it would not be suitable for situations where the force required for operation of the strain gauge is large compared to the force deforming the structure. Furthermore, resistance-type strain gauges are permanently deformed if the displacement exceeds a given value and cannot be used for measurements exceeding a certain number of cycles. Other devices have also served as displacement measuring devices, including piezoelectric devices, capacitance devices, or inductance devices. The piezoelectric devices produce a voltage output that is proportional to the strain applied. However, again a force is required on the piezoelectric device for operation. Furthermore, piezoelectric devices typically have a significant hysteresis, making repeatability of measurements difficult.

Capacitance devices typically work by passing a radio frequency current through the parallel plates of a capacitor, which are attached to the objects to be measured. The change in capacitance between the capacitor plates is used as an indication of the displacement of the plates. Inductance position measuring devices typically operate by varying the position of a high permeability core inside of an inductor. While capable of a precise measurement, typically the core has a relatively large mass, limiting the frequency response.

Optical devices have also been used for measuring distances or displacements which overcome certain of the above shortcomings. For very precise measurement, optical interference devices have been used. These typically use a laser or other monochromatic light source to obtain an interference pattern that can be used to determine the displacement of a device. While very accurate, such devices typically require elaborate supporting electronics, especially if rapid readout of a distance or a displacement is required. Various other optical devices have also been used. These include measuring the position of a reflected optical spot on a detector to determine the position of the reflective surface. Two reflective surfaces at right angles have also been used in an optical strain gauge (a "Tuckerman extensometer") wherein one of the surfaces rotates, with the resulting deflection of the light beam being determined by means of a reticle. Also, a bundle of parallel optical fibers has been used to obtain optical displacement measurements; see, for example, U.S. Pat. No. 3,327,584.

SUMMARY OF THE INVENTION

We have invented a precision optical distance or displacement measuring method and apparatus which makes use of a light source and a light detector. In a first embodiment, the light source and light detector are directed at each other, with the distance or displacement between them being measured. In a second embodiment, the light source and light detector are directed at a reflective surface, and the distance or displacement between the detector and the reflective surface is measured. In either of these embodiments, the sensitivity of the device is substantially increased by tilting the axis of the cone of illumination of the source and the axis of the cone of detection of the detector relative to a measurement axis. In other embodiments, the effect of the tilted axes is obtained by the use of two reflective members. The source is typically a light emitting diode or laser, and the detector is typically a phototransistor or photodiode.

DETAILED DESCRIPTION

Figure 1:
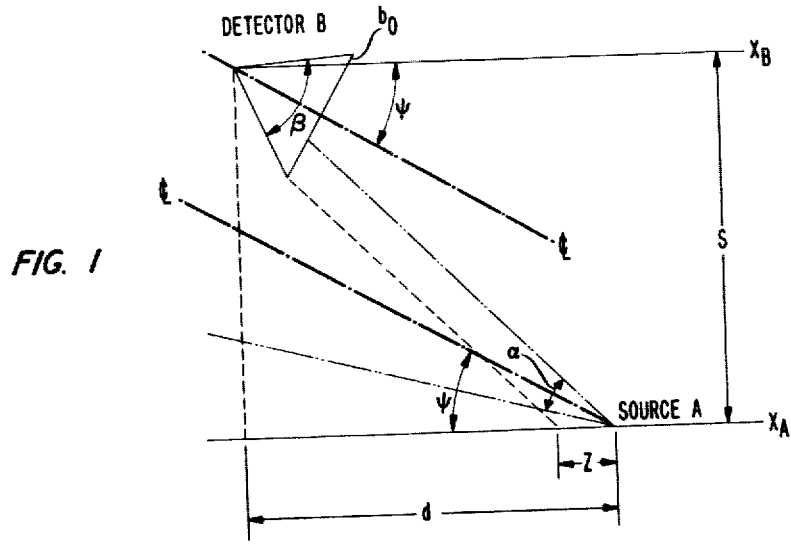
FIG. 1 shows a first embodiment with the optical source and optical detector facing each other.

The following description relates to a precision optical distance or displacement measuring method and apparatus. As used herein, the term "displacement" means a change in distance. Also as used herein, the terms "light", "optical", and "illumination" include infrared, visible, and ultraviolet radiation. Referring to FIG. 1, an optical source A is directed towards an optical detector B. Source A and detector B are considered to be an idealized point source and detector separated by distance d, as measured along the measurement axis $X_A$. Source A radiates a cone of illumination having an angle $\alpha$. Detector B has a cone of detection having an angle $\beta$ and an optically sensitive surface with an effective area $b_o$. The surfaces of these cones are the points of half maximum illumination and detection sensitivity, respectively, at given distances from the source and detector. The cross-sectional shape of these cones is typically circular but can be ellipsoidal or other shapes. Optical lenses can be included as part of source A and detector B.

The output of detector B increases as the incident illumination on the optically sensitive surface increases. Although area $b_o$ is shown relatively large in FIGS. 1 and 2 for clarity, area $b_o$ is smaller than the total cross-sectional area of the cone of illumination at the point of intersection of the cone with area $b_o$, for all measurement distances d included herein. As shown in FIG. 1, the incident illumination on area $b_o$ increases as the cone of illumination from source A fills a larger proportion of area $b_o$. At distances less than d (defined below), this increase occurs even though A and B are moving farther apart, as shown by displacement Z. By measuring the output of detector B, the distance or displacement between source A and detector B is determined. Source A and detector B move relative to each other along parallel but noncoincident axes $X_A$ and $X_B$, respectively. This relative movement includes the case wherein either the source or detector is in a fixed position, with the relative movement being due to the movement of the other. These axes pass through the point source A and the point detector B, respectively, and are separated by a distance S. Either of these axes, or any axis parallel to them, is called a "measurement axis", as the distance or displacement along such axis is being measured. Source A and detector B are tilted towards each other by angle $\Psi$, which represents the angle between the axes of the cones of detection and illumination and the measurement axis. The embodiment of FIG. 1 is herein also called the "direct" method.

Figure 2:
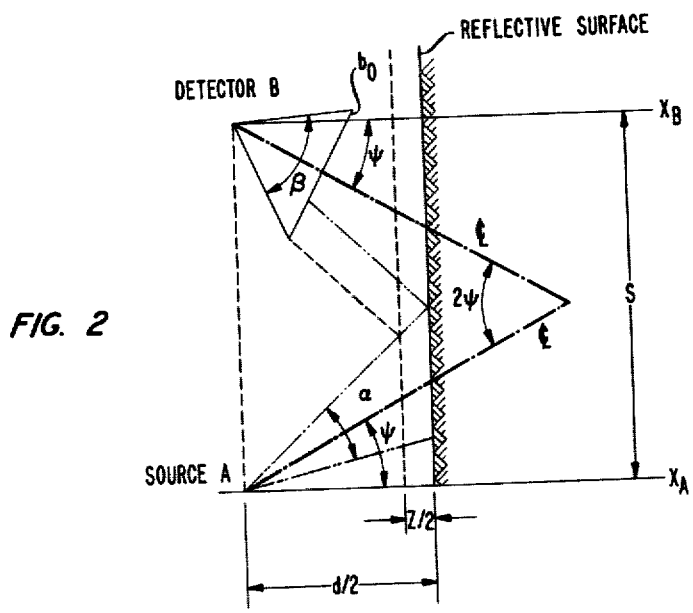
FIG. 2 shows a second embodiment with an optical source and an optical detector facing a reflective surface.

A second embodiment, herein also called the "reflection" method, is shown in FIG. 2 wherein source A is on the same side of a reflective surface as detector B. For convenience, both source A and detector B are shown located the same distance from the reflective surface, but they can be located at different distances. The reflective surface is typically flat and is typically chosen to have a reflectivity greater than 50 percent for the illumination used. The cone of illumination of source A and the cone of detection of detector B have their major axes tilted with respect to axes $X_A$ and $X_B$ by angle $\Psi$, as above. Note that the axes of the cones of illumination and detection are thereby tilted so that they intersect at an included angle of $2\Psi$. Axes $X_A$ and $X_B$ are spaced a distance S from each other. For a given tilt $\Psi$, and a given distance between the axes S, it can be seen that the situation in FIG. 2 is geometrically equivalent to the situation in FIG. 1. Note, however, that the distance between source A, detector B, and the reflective surface is d/2 in FIG. 2, in order to produce a geometry equivalent to a spacing d between source A and detector B in FIG. 1. Also note that a displacement of Z/2 in FIG. 2 is equivalent to a displacement Z in FIG. 1. Thus, for a perfectly reflective surface, a given change in output of detector B is caused by ½ as much displacement in the reflection embodiment as compared to the displacement in the direct embodiment. However, in the reflection embodiment, the amount of light reaching detector B from source A will be diminished somewhat by a constant amount due to the reflectivity of the reflective surface.

Figure 3:
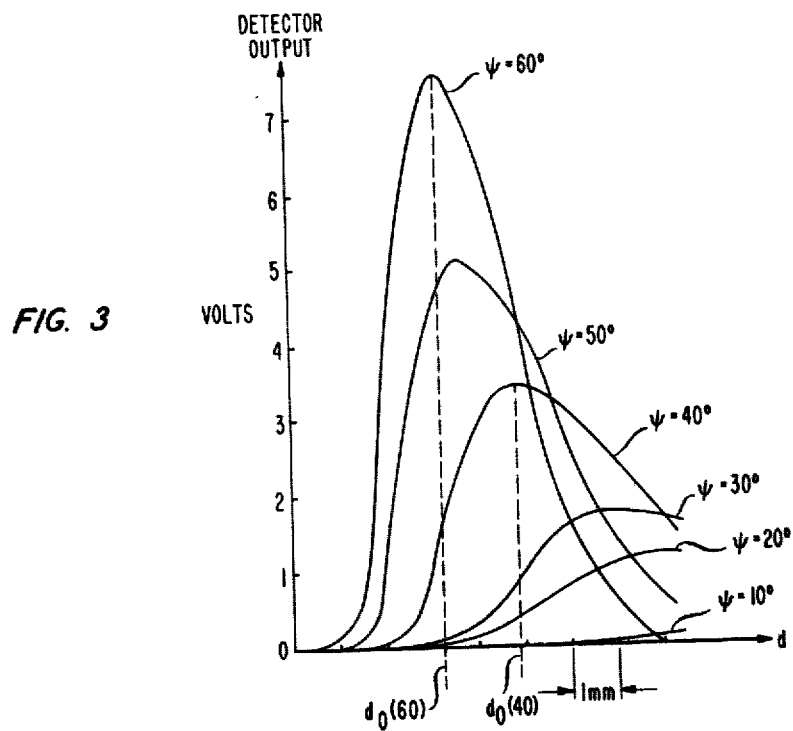
FIG. 3 shows typical response curves for various degrees of tilt of the axes of the source and detector.

The present invention relates to the discovery that by tilting the axes of the cones of illumination of source A and of detection of detector B relative to the measurement axis, the sensitivity increases. In the embodiments of FIGS. 1 and 2, "sensitivity" is defined as the change in output of detector B due to a change in distance d (or d/2). The sensitivity is especially high in the "high response" region. This region is defined as the separation between source A and detector B, as measured along the measurement axis, less than that which produces maximum output in detector B. Referring to FIG. 3, it can be seen for a given amount of tilt (i.e., a given value of $\Psi$) the output from detector B is increasing rapidly up to a separation $d_O$ ($\Psi$) and falls off more slowly beyond that separation. Thus, the "high response" region includes all separations less than $d_O$, for a given tilt ($\Psi$) and a given distance (S) between axes $X_A$ and $X_B$.

However, note that the detector output curves of FIG. 3 become more symmetrical for large values of $\Psi$, becoming substantially symmetrical for $\Psi = 90$ degrees (not shown). Thus, high sensitivity is obtained on either side of $d_o$ ($\Psi$) for large values of $\Psi$, typically $\Psi$ larger than approximately 60 degrees in the direct embodiment, and thus $2\Psi$ larger than approximately 120 degrees in the reflection embodiment. The shape of the detector output curve is the same whether produced by the arrangement of FIG. 1 or FIG. 2, except that the output in the case shown in FIG. 2 will be reduced by a constant of proportionality due to the reflectivity of the surface mentioned above. Curves of the detector output as a function of distance d, as shown in FIG. 3, can be used to calibrate the system. A distance or displacement can be determined by appropriate means for measuring the output of the detector for comparison with such calibration curves. Information initially derived from such curves can be stored by means of an electronic memory, for example, and compared with the measured output of the detector by electronic comparison means to determine distance or displacement.

It has further been discovered that for a given value of tilt, the sensitivity is also increased by decreasing the distance S between the axes $X_A$ and $X_B$. Maximum sensitivity is obtained in the embodiment of FIG. 1 when the axis of the cone of illumination is parallel to the axis of the cone of detection. This implies that these axes are each tilted by the same angle ($\Psi$) with respect to the measurement axis for both the embodiments of FIG. 1 and FIG. 2. However, a difference in the angles of tilt for the axes of the cones of illumination and detection of up to 10 degrees is acceptable. Another factor affecting performance is the angle of the cone of illumination, $\alpha$. Larger values of $\alpha$ will result in a shorter high response region, i.e., $d_o$ ($\Psi$) becomes less for a given $\Psi$. This in turn results in higher sensitivity over the shortened range. Typically, $\alpha$ is less than 90 degrees for acceptable range. The angle of the cone of acceptance, $\beta$, and the size of the light sensitive area $b_o$ also affect the sensitivity. Larger values of $\beta$ and smaller values of $b_o$ result in increased sensitivity but decreased range. Typically, $\beta$ is less than 90 degrees for acceptable sensitivity and range when detector B is a photodiode or phototransistor. The values of both $\alpha$ and $\beta$ are typically determined by lenses on the source and detector. In any case, however, tilting the axes of the cones of illumination and detection increases sensitivity. Details of the factors affecting performance and the experimental arrangement used to generate the curves of FIG. 3 will be more fully illustrated by means of the following example:

EXAMPLE

The source used in this example is a light emitting diode having a 24 degree beam width ($\alpha$), operating at a wavelength of 0.93 microns (Sensor Technology, Inc., No. STLD-1600-3). The current through the LED is 60 ma. The detector is a phototransistor having a 48 degree angle of detection (62) and having a peak wavelength response at 0.8 microns (Sensor Technology, Inc., No. STPT-64). The phototransistor is powered by a 10 volt power supply. The emitter output of the detector is coupled to digital voltage mesurement means. The initial distance between the axes of the source and detector (FIG. 1) was 2.5 millimeters. The response curves for various degrees of tilt of the source and detector (angle $\Psi$) are shown in FIG. 3. It can be seen that the output sensitivity increases significantly for angles of tilt ($\Psi$) greater than about 10 degrees and preferably greater than 20 degrees. The large change in detector output voltage for a small change in distance d shows that high sensitivity is obtained. The high sensitivity obtained at $\Psi = 60$ degrees, for example, allows a typical resolution of better than 5 microinches (0.125 micrometers) over a range in the high response region of about 50,000 microinches (1.25 millimeters), or better than $10^{-4}$, with the above-named electronics. The maximum sensitivity is obtained at $\Psi=90$ degrees (not shown). However, in the reflection embodiment of FIG. 2, $\Psi$ can approach, but not equal, 90 degrees in order to obtain a reflection; that is, the included angle $2\Psi$ can approach but not equal 180 degrees. Note also that the range of the high response region becomes smaller as the sensitivity increases for larger values of $\Psi$.

Figure 4:
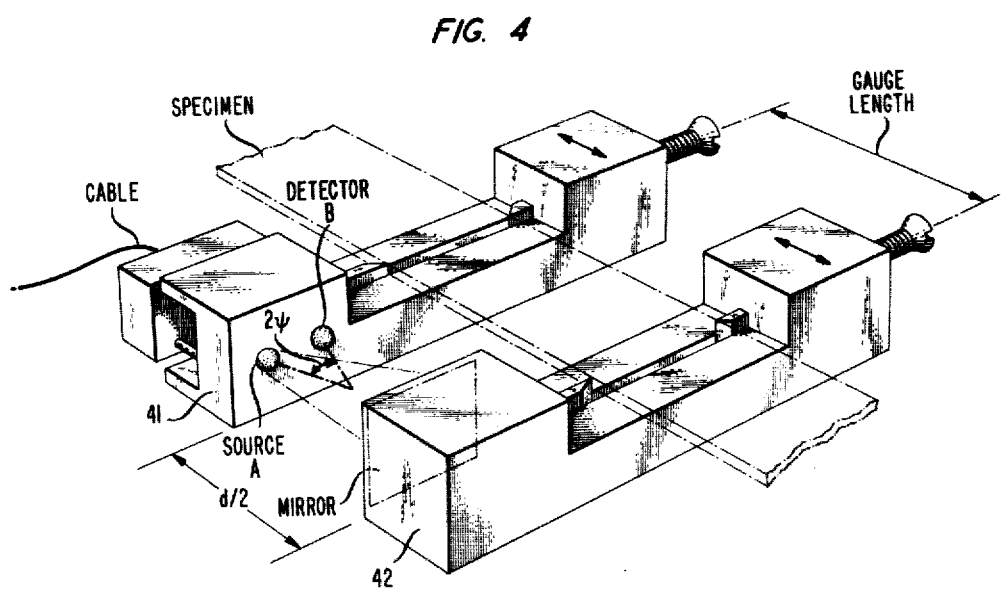
FIG. 4 shows a typical arrangement of an extensometer utilizing the inventive method.

Among the numerous physical arrangements for positioning the optic source and optic detector is the extensometer shown in FIG. 4. Here a single LED source and phototransistor detector are operated in the reflection embodiment. The source and detector are located on mount 41 while the reflecting mirror is located on mount 42. The distance d/2 is not necessarily to scale, being shown typically increased for clarity. A specimen is clamped between the mounts. However, separate mounts are not necessary. It is possible in many instances to mount the source and detector directly on the object to be measured by the direct method. It is also possible to reflect light directly off the object to be measured or off a reflector mounted thereon, by the reflection method. If, for example, the reflective surface is a pressure-sensitive surface, then a pressure sensor is obtained and is included herein. Unlike certain previous pressure sensors using reflected light, the surface herein need not deform in order to change the angle of reflection, but can remain substantially flat.

Figure 5:
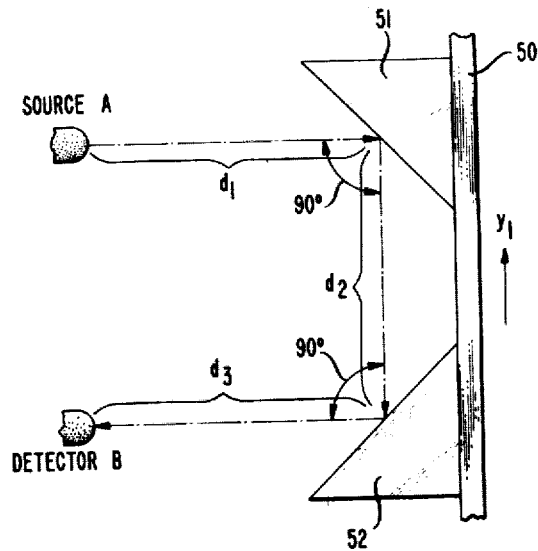
FIGS. 5 and 6 show a third and fourth embodiment of the inventive method, wherein two reflective members are used.
Figure 6:
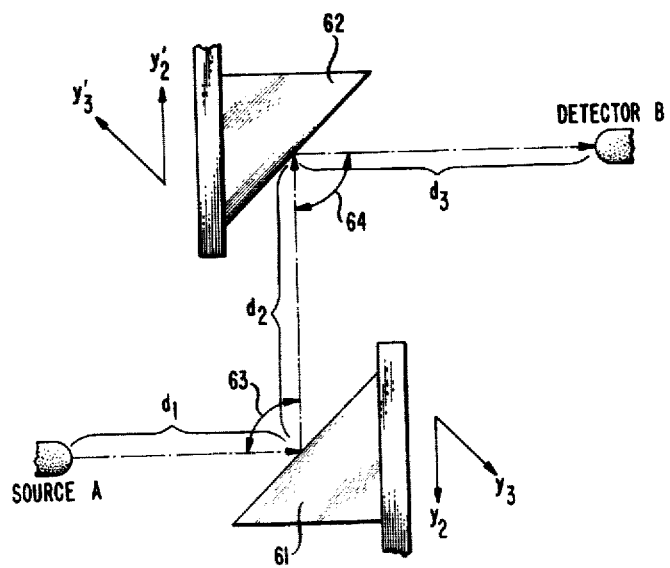

Other embodiments that achieve high sensitivity are shown in FIGS. 5 and 6. Here, the light is reflected from two reflecting members on the object being measured, allowing the source and detector to be located externally. For clarity, only the axes of the cones of illumination and detection are shown. In these embodiments, "sensitivity" is defined as the change in output of detector B due to a change in position of the reflective members along a given measurement axis or axes as further defined in each case. Source A and detector B are typically stationary in these embodiments. However, the reflective members can be stationary, with the relevant distance or displacement of the source and detector along the measurement axis being measured. Although reflections from two surfaces are shown in FIGS. 5 and 6, internal reflection or refraction, as from a prism, can also be used, with prismatic members being included in the term "reflective member", and "refraction" being included in the term "reflection".

In FIG. 5, the position or displacement of object 50 along axis $Y_1$ is measured. In this embodiment, the total angles of reflection add up to approximately 180 degrees, producing an equivalent 180 degree included angle for $2\Psi$ (and a 90 degree angle for $\Psi$). This obtains the highest sensitivity for displacement of object 50 along axis $Y_1$, wherein reflective members 51 and 52 are translated in the same direction but do not move relative to each other. The 180 degree total reflection can be obtained from two 90 degree reflections as shown, or from other combinations that total 180 degrees, such as 60 degrees and 120 degrees, etc.

In the embodiment of FIG. 6, the distance or displacement between members 61 and 62 is measured with high sensitivity. However, a translation of members 61 and 62 in the same direction along any axis has relatively little effect on the output of detector B. Thus, if members 61 and 62 are mounted on a body, only the strain in the body will be measured, not the net motion.

To obtain this effect, the reflective surfaces of reflective members 61 and 62 should be substantially parallel. The 90 degree angle shown for each of included angles of reflection 63 and 64 results in an equivalent tilt of $\Psi=45$ degrees ($2\Psi=90$ degrees), with larger included angles, up to 180 degrees each, producing higher sensitivity. In addition, maximum sensitivity is obtained for displacement of members 61 and 62 along axes $Y_3$ and $Y_3'$, respectively, which are perpendicular to the reflective surfaces. Displacement along axes $Y_2/Y_2'$, for example, can also be measured, but at reduced sensitivity.

In both the embodiments of FIGS. 5 and 6, highest sensitivity is obtained when the axis of the cone of illumination is substantially parallel to the axis of the cone of detection, with a deviation from parallelism of up to 10 degrees being acceptable. This implies that in the embodiment of FIG. 5, the direction of illumination along the axis of the cone of illumination is substantially antiparallel (i.e., in an opposite direction) to the direction of the illumination along the axis of the cone of detection. In the embodiment of FIG. 6, this also implies that such directions of illumination are substantially parallel. A laser or an LED having a small angle $\alpha$ for the cone of illumination is a preferred source in many applications utilizing the embodiments of FIGS. 5 and 6, as the relatively narrow cone of illumination allows wider separation between the various elements as compared to sources having a wider angle of illumination.

It can readily be seen that a multitude of uses are possible for the above-described device. In particular, very high resolution measurement of displacements or distances are now possible with essentially zero hysteresis and low mass. This allows for relatively high-speed, high-frequency measurement of mechanical vibration, for example. The strain in a mechanical member can be obtained accurately at low cost with this device. The precise positioning of objects along a production line is possible. The placement of semiconductor wafers, as for a lithographic or other processing step, is also facilitated. A moving member, such as a robot arm, can be precisely positioned. Real time monitoring of critical structures can be accomplished to provide a warning for the onset of metallurgical fatigue. The response of the present device is limited only by the response of the detector and associated electronics, and with the phototransistor of the above example, a response of 100 kilohertz is obtained.

For making distance or displacement measurements over an extended period of time, greater than a few hours, for example, it is desirable to stabilize the light output from the source. A number of stabilization schemes are known in the prior art. One effective technique utilizes optical feedback. In this method, a portion of the light from the source is directed towards a second detector, mounted at a fixed distance from the source. The output of this second detector is coupled back through a feedback network to control the intensity of the source, compensating for temperature and aging effects, thereby obtaining substantially constant brightness from the source. Alternately, or additionally, an LED source, among others, may be stabilized by pulsing at a low duty rate. This allows high peak optical output for maximum sensitivity while maintaining low power dissipation in the LED, thus helping to maintain light output more constant over a period of time. A phase locked circuit may also be employed to improve stability and sensitivity. In that case, the intensity of the source is modulated, and the detector circuitry responds only to the modulated signal, by principles known in the measurement art.

A variety of light sources may be used in practicing the present invention. A light emitting diode is the presently preferred source, due to its low cost, light weight, and low power requirements. However, a laser can also be used, with a solid state laser diode being convenient for many situations. Luminous materials that do not require an external power source (e.g., radium) can also be used. Similarly, the detector may be any of a number of light sensitive devices, including photodiodes, phototransistors, photocells, photoresistors, etc. Photodiodes and phototransistors, including photodarlington transistors, are presently preferred detectors, as they have a relatively small light sensitive area, typically less than one square millimeter, resulting in high sensitivity. The output of the detector can be a voltage, current, conductance, resistance, or other light sensitive parameter. Furthermore, the light need not radiate directly from the source, but can be conducted from the source by means of an optical fiber, being radiated from the end of the fiber, to produce a cone of illumination. Similarly, the detector can receive the reflected light by means of an optical fiber, with the cone of acceptance of the fiber being considered the cone of detection of the detector. A lens can be formed on the end of the optical fiber to vary the angles of the cones of illumination or acceptance, ($\alpha$ or $\beta$), according to principles known in the art. All such variations and deviations which basically rely on the teachings through which this invention has advanced the art are properly considered to be within the spirit and scope of this invention.

We claim:

1. A method of measuring distance or displacement parallel to a measurement axis comprising the step of directing light from a source toward a detector, with said source producing a cone of illumination and said detector having a light sensitive area within a cone of detection, wherein the output of said detector increases as the illumination incident upon said light sensitive area increases, and wherein said source and said detector move relative to each other along noncoincident axes which are parallel to said measurement axis,
    characterized in that the axis of said cone of illumination and the axis of said cone of detection are each tilted by angles greater than 10 degrees with respect to said measurement axis.

2. The method of claim 1 further characterized in that the separation between said source and said detector as measured along said measurement axis is less than that separation which produces maximum output of said detector to said radiation from said source, thereby measuring said distance or displacement in the high response region.

3. A method of measuring distance or displacement comprising the step of directing light from a source toward a surface, with said source producing a cone of illumination, and detecting light from said source reflected from said surface by means of a detector having a light sensitive area within a cone of detection, wherein the output of said detector increases as the illumination incident upon said light sensitive area increases, and wherein said output is used as the measure of said distance or displacement,
    characterized in that the axis of said cone of illumination and the axis of said cone of detection are tilted so that they intersect at an included angle greater than 20 degrees, and further characterized in that the separation between said detector and said surface is less than that which produces maximum output of said detector to the light from said source reflected from said surface, thereby measuring said distance or displacement in the high response region.

4. A method of measuring distance or displacement parallel to a given measurement axis characterized by directing light from a source producing a cone of illumination onto a first reflective member, with light reflected therefrom onto a second reflective member, and detecting light reflected from said second member with a detector having a light sensitive area within a cone of detection, wherein the output of said detector increases as the illumination incident upon said light sensitive area increases, and wherein said illumination incident upon said area depends upon the positions of said reflective members along said measurement axis relative to the positions of said source and detector along said measurement axis.

5. The method of claim 4 further characterized in that the direction of illumination along the axis of the cone of illumination is substantially antiparallel to the direction of the illumination along the axis of the cone of detection.

6. The method of claim 4 further characterized in that the direction of illumination along the axis of the cone of illumination is substantially parallel to the direction of the illumination along the axis of the cone of detection.

7. The method of claim 6 further characterized in that the included angles of reflection from said first and second reflective members are each at least 20 degrees.

8. The method of claims 1, 2, 3, 4, 5, 6, or 7 further characterized in that said source is a light emitting diode or laser.

9. The method of claim 8 further characterized in that said detector is a photodiode or a phototransistor.

10. An apparatus comprising a light source producing a cone of illumination directed toward a detector having a light sensitive area within a cone of detection, wherein the output of said detector increases as the illumination incident upon said light sensitive area increases, and wherein said source and said detector are capable of motion relative to each other along noncoincident axes that are parallel to a measurement axis, characterized in that the axis of said cone of illumination and the axis of said cone of detection are each tilted by angles greater than 10 degrees with respect to said measurement axis.

11. The apparatus of claim 10 further characterized in that the separation between said source and detector as measured along said measurement axis is less than that which produces maximum output of said detector to light from said source, thereby obtaining increased sensitivity.

12. An apparatus comprising a light source having a cone of illumination directed toward a surface, and a detector having a light sensitive area within a cone of detection directed toward said surface so as to detect a portion of the light from said source reflected from said surface, wherein the output of said detector increases as the illumination incident upon said light sensitive area increases, and further comprising means for measuring the output of said detector so as to determine the distance or displacement of said surface relative to said source and detector, characterized in that the axis of said cone of illumination and the axis of said cone of detection are tilted so that they intersect at an included angle greater than 20 degrees, and further characterized in that the separation between said detector and said surface is less than that which produces maximum output of said detector to the light from said source reflected from said surface, thereby obtaining increased sensitivity.

13. An apparatus comprising a light source having a cone of illumination and a detector having a light sensitive area within a cone of detection, wherein the output of said detector increases as the illumination incident upon said light sensitive area increases, characterized in that said apparatus further comprises first and second reflective members capable of motion parallel to a given measurement axis, wherein the first reflective member reflects light from said source onto the second reflective member, which in turn reflects a portion of said light onto said detector, and further characterized in that the axis of the cone of illumination is substantially parallel to the axis of the cone of detection.

14. The apparatus of claim 13 further characterized in that the direction of illumination along the axis of the cone of illumination is substantially antiparallel to the direction of the illumination along the axis of the cone of detection.

15. The apparatus of claim 13 further characterized in that the direction of illumination along the axis of the cone of illumination is substantially parallel to the direction of the illumination along the axis of the cone of detection.

16. The apparatus of claim 15 further characterized in that the included angles of reflection from said first and second reflective members are each at least 20 degrees.

17. The apparatus of claims 10, 11, 12, 13, 14, 15, or 16 further characterized in that said source is a light emitting diode or laser.

18. The apparatus of claim 17 further characterized in that said detector is a photodiode or a phototransistor.

19. The apparatus of claims 10, 11, 13, 14, 15, or 16 further characterized in that said apparatus further comprises means for measuring the output of said detector so as to determine distance or displacement along said measurement axis.

* * * * *